(12) United States Patent
Randono et al.

(10) Patent No.: US 10,643,493 B2
(45) Date of Patent: May 5, 2020

(54) MATH ENGINE AND COLLABORATION SYSTEM FOR TECHNICAL EXPRESSION MANIPULATION

(71) Applicant: Alef Omega, Inc., Boulder, CO (US)

(72) Inventors: Andrew Randono, Boulder, CO (US); Hans Westman, Westminster, CO (US)

(73) Assignee: Alef Omega, Inc., Boulder, CO (US)

( * ) Notice: Subject to any disclaimer, the term of this patent is extended or adjusted under 35 U.S.C. 154(b) by 265 days.

(21) Appl. No.: 15/886,830

(22) Filed: Feb. 1, 2018

(65) Prior Publication Data

US 2018/0218638 A1  Aug. 2, 2018

Related U.S. Application Data

(60) Provisional application No. 62/453,741, filed on Feb. 2, 2017.

(51) Int. Cl.
| | |
|---|---|
| *G09B 19/02* | (2006.01) |
| *G09B 7/02* | (2006.01) |
| *H04L 12/18* | (2006.01) |
| *G06F 3/0486* | (2013.01) |
| *G06F 3/0488* | (2013.01) |
| *G06Q 10/10* | (2012.01) |

(52) U.S. Cl.
CPC ......... *G09B 19/025* (2013.01); *G06F 3/0486* (2013.01); *G06F 3/04883* (2013.01); *G06F 3/04886* (2013.01); *G06Q 10/101* (2013.01); *G09B 7/02* (2013.01); *H04L 12/1822* (2013.01)

(58) Field of Classification Search
CPC . G06F 3/0486; G06Q 10/101; H04L 12/1822; G09B 19/025
See application file for complete search history.

(56) References Cited

U.S. PATENT DOCUMENTS

| | | |
|---|---|---|
| 9,092,317 B2 | 7/2015 | Jacobson et al. |
| 2003/0101235 A1* | 5/2003 | Zhang .................... H04L 51/04 709/218 |

(Continued)

OTHER PUBLICATIONS

Andrewbragdon, "Hands-On Math: A Page-Based Multi-Touch and Pen Desktop for Technical Work and Problem Solving", "Retrieved from https://youtube.com/watch?v=pYuDTOqFMqc", Jan. 20, 2011, p. 1.

(Continued)

*Primary Examiner* — Nathan Hillery
(74) *Attorney, Agent, or Firm* — Neugeboren O'Dowd PC

(57) ABSTRACT

This disclosure describes systems, methods, and apparatus for low-latency math expression manipulation, communication, and collaboration across multiple peer devices. A controlling peer device can detect a drag node event, pass a network ID of a selected node to at least a second peer device, where the second peer device can locally process the network ID and update a local instantiation of an expression tree and UI rendered from the local expression tree. The controlling device can generate drop regions based on the selected node and the existing tree structure and pass an indication of the drop region to the second peer device. The controlling peer device can detect release of the dragged node within a drop region and pass a network ID of the drop region to the second peer device, which then locally updates its expression tree and UI based on the network ID of the drop region.

16 Claims, 10 Drawing Sheets

(56) References Cited

U.S. PATENT DOCUMENTS

| | | | | |
|---|---|---|---|---|
| 2004/0017403 | A1* | 1/2004 | Andersson | G06F 11/3447 715/848 |
| 2006/0062467 | A1* | 3/2006 | Zou | G06K 9/222 382/186 |
| 2006/0062468 | A1* | 3/2006 | Xu | G06K 9/222 382/186 |
| 2006/0062469 | A1* | 3/2006 | Li | G06K 9/222 382/186 |
| 2006/0062470 | A1* | 3/2006 | Zhu | G06K 9/00436 382/186 |
| 2006/0062471 | A1* | 3/2006 | Xu | G06K 9/00422 382/186 |
| 2014/0325373 | A1* | 10/2014 | Kramer | G06F 3/017 715/740 |
| 2015/0077326 | A1* | 3/2015 | Kramer | H04L 67/025 345/156 |
| 2017/0084197 | A1* | 3/2017 | Crouse | G09B 19/025 |
| 2018/0232352 | A1* | 8/2018 | Fulford | G06F 17/212 |

OTHER PUBLICATIONS

Graspable, Inc., "Untitled Math Sheet", "Retrieved from https://graspablemath.com/canvas downloaded on Feb. 25, 2020", Known to exist as early as Feb. 25, 2020, p. 1.
Orion Math, "Mathination—Equation Solver", "Retrieved from https://appadvice.com/app/mathination-equation-solver/396330942 on Feb. 25, 2020", 2010, p. 5.

* cited by examiner $$X = 2 + 3$$

FIG. 6A $$X = 2\,{}_2^{\phantom{2}}+ 3$$

MATH ENGINE AND COLLABORATION SYSTEM FOR TECHNICAL EXPRESSION MANIPULATION

CLAIM OF PRIORITY UNDER 35 U.S.C. § 119

The present Application for Patent claims priority to Provisional Application No. 62/453,741 entitled "Communication and Collaboration System for Technical Expressions" filed Feb. 2, 2017, and assigned to the assignee hereof and hereby expressly incorporated by reference herein.

FIELD OF THE DISCLOSURE

The present disclosure relates generally to collaboration on manipulation of technical expressions. In particular, but not by way of limitation, the present disclosure relates to systems, methods and apparatuses for shared viewing and manipulation of technical expressions such as algebraic equations.

DESCRIPTION OF RELATED ART

Mathematics education has a history of exploratory learning. A progression of manipulative devices have transformed mathematical abstractions into arrangements of concrete objects made of wood, bone, metal or polymer. Some of these illustrate the properties of numbers, others allow the student to explore operations. Some manipulatives (such as the abacus and the slide rule) demonstrate utility beyond learning and enter the everyday toolbox of those who work with numbers.

The introduction of the electronic digital computer allows the evolution of logical systems not limited to manipulation of numbers. Symbolic logic is an early concern of computer scientists. An application providing this capability is called a Computer Algebra System (CAS).

Like most CAS packages, Maple and Mathematica are solvers—not teaching programs. They do not demonstrate the internal steps required to go from problem to solution.

The prior art includes several examples of interfaces built on top of Computer Algebra Systems with the intent of providing a learning experience.

Certain packages, such as the Algebrator (SoftMath, 1990) explicitly show every step of the transition, and provide textual explanation of each of these steps. This is meant to educate the student, but it offers no exploratory pathways. Marketed to students as an automated tutor, it could also be abused as a homework robot.

Bonadio (1993) teaches a Computer Algebra System in which a graphic user interface (GUI) allows users to enter commands. Bonadio's system, known variously as Theorist, MathView and LiveMath employs a GUI to direct the CAS to derive a new expression from the existing expression, and to display the new one below the old one. A sequence of expressions cascade down the screen. By displaying line after line of expressions, in the manner of a console-driven application, the software does not behave like a manipulative device. Further, Bonadio's device offers no algebraic response to the user's actions until the user had completely specified the operation.

Vernon (application 2004) demonstrates concern for the learning process, and introduces an interactive experience that monitors student performance. Given an expression, the student types in a line of text which represents the new expression after applying an algebraic operation, as a single step toward the solution. The software analyzes both initial and subsequent statements, and searches a rulebook to determine the validity of the student's work. Errors, of course, are flagged. The steps are repeated until the solution is arrived at.

Vernon's technological claims, which—like most CAS engines—focus on the nodal structure of expressions, are interesting in that they amount to a sophisticated equivalent of the "diff" program: they compare two expressions and remove the equivalences. The remaining elements are subjected to a search through a rulebook database.

Vernon's invention compels the student to iteratively enter ASCII text strings with incremental changes to the statement—rather than directly moving the terms of a classical math representation. It only tests the validity of work after it is performed, rather than supporting the exploratory learner with hints, previews and suggestions.

MathDrag'n, Mathination, Hands-on Math, Algebra Touch, Graspable Math, and DragonBox are various currently or previously-available products for touch-based manipulation of expressions.

Jacobson (U.S. Pat. No. 9,092,317) teaches a tool for manipulating the terms of an algebraic expression. This device is a computational engine which performs the logical manipulation of symbols as permitted by algebraic rules, with a corresponding display system that exposes representations of these symbols to the user, and a corresponding input system which registers the user's signals of intent.

Yet, math training often involves collaboration on a single expression between two users on separate devices. None of the known solutions, despite attempting to solve this problem for over a decade (e.g., MathDrag'n was released in 2006), discuss or enable a method for collaborative manipulation of the same expression on two different devices that can be remote from each other (i.e., those that are not on the same local area network or LAN).

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Existing mathematical platforms, aside from Jacobson, are not suitable for free-form manipulation of mathematical expressions. While Jacobson makes progress in this area, it does not provide an enabling solution for multi-party collaboration on math expression manipulation. Nor are traditional mathematical platforms well-suited for real-time collaboration across multiple computing devices. Thus, a need exists, for real-time (i.e., low latency) collaboration on manipulation of mathematical expressions across multiple computing devices. Given, the lack of appropriate collaborative tools in the mathematical space, the inventors recognized that multiplayer gaming platforms might provide a solution. Although gaming platforms, such as first person shooters, often show guns, monsters, enemies, and fellow avatars in a 3D world, these objects could be replaced with elements of mathematical expressions, to hopefully provide real-time math collaboration.

While this approach in and of itself was non-intuitive, it also led to problems. The inventors' initial attempt to use an existing multiplayer gaming platform, the Unity Engine from Unity Technologies, was fraught with latency issues rendering the prototype unusable for real-time collaboration.

The inventors then started to depart from existing multiplier gaming platforms, but built on the underlying technology, to develop the herein disclosed math collaboration platform that achieved the low-latency that traditional gaming engines were unable to achieve.

Their solution, in one aspect is a method of low-latency math expression manipulation collaboration across multiple client devices. The method can include receiving, at a first client device, user inputs indicating a desire to generate a mathematical expression on a user interface of the first client device. The method can include, in response, generating, via the first client device, a first local mathematical expression tree with nodes representing elements in a first local mathematical expression and storing the same to a memory of the first client device. The method can also include assigning, via the first client device, a node type label to each node in the first local mathematical expression tree to define a type of each of the nodes. The method can yet further include determining, via the first client device, which of the nodes are touchable. The method can also include comparing, via the first client device, each node in the first local mathematical expression tree to one or more math rules to identify those of the nodes in the first local mathematical expression tree that are movable nodes. The method can yet also include assigning, via the first client device, an interaction target to each of the movable nodes, where each interaction target registers touch and drag events on a corresponding one of the movable nodes as well as collision events with other nodes, movable or non-movable, in the first local mathematical expression tree. The method can further include passing node information for each of the nodes in the first local mathematical expression tree, including a network ID array of the selected node, a network id array of a parent node, and a Sibling Index, to a second client device, wherein the node information is a minimum amount of information that a second client device needs to recreate the first local mathematical expression tree. The method also includes, generating, via the second client device, a second local mathematical expression tree, identical to the first local mathematical expression tree, based on the node information from the first client device, with nodes representing elements in the second local mathematical expression tree representing elements in a second local mathematical expression and storing the same to a memory of the second client device.

Another aspect of the disclosure can be described as a method of low-latency math expression manipulation collaboration across multiple peer devices. The method can include generating a first local mathematical expression tree on a first client device. The method can include for each node in the first local mathematical expression tree, passing a network ID for each node, a network ID of the parent ID of each node, and a Sibling Index of each node, to a second client device. The method can further include generating a second local mathematical expression tree on the second client device based on the network ID array. The method can yet also include receiving, at the first client device, a first dragged node indication telling the first client device that a first user has started dragging a first node in the first local mathematical expression tree, and generating a first timestamp in response to the first receiving. The method can also include sending the first timestamp to the second client device. The method can also include receiving, at the second client device, a second dragged node indication telling the second client device that a second user has started dragging a second node in the second local mathematical expression tree. The method can yet also include generating a second timestamp in response to the first receiving, sending the second timestamp to the first client device, and resolving at both the first and second client devices, that the first timestamp has an earlier value than the second timestamp. The first client device can become the controlling client device and the second client device can become the slave client, and this can be done independently on each device. After this, the second client device can prevent the second user from manipulating the mathematical expression. The method can also include creating, via the first client device, a first dragged node on the controlling client device as a duplicate of the first node, and sending, via the controlling client, dragged node information to the slave client. Lastly, the method can include rendering updates to the second local mathematical expression tree to a display of the second client device.

Some embodiments of the disclosure may be characterized as a method of low-latency math expression manipulation, communication, and collaboration across multiple peer devices. The method can include providing a first local mathematical expression tree on a first peer device and a second local mathematical expression tree on a second peer device, wherein renderings of the first and second local mathematical expression trees appear as the same expressions on respective graphical user interfaces of the first and second peer devices. The method can include detecting, at the first peer device, that a user is dragging a portion of the expression, the portion identified as a picked node in the first local mathematical expression tree. The method can include identifying, via the first peer device, a plurality of drop regions in the first local mathematical expression tree. The method can include sending at least an identification of the picked node from the first peer device to the second peer device. The method can include detecting, via the first peer device, a collision between the portion of the first expression being dragged by the user and a first drop region. The method can include sending at least an identification of the first drop region from the first to the second peer device, and in response to the identification of the first drop region and the picked node, animating the second expression. The method can include detecting, via the first peer device, that the user has released the portion of the first expression in proximity to a triggered drop region. The method can include sending at least an identification of the triggered drop region to the second peer device. The method can include determining, via the second peer device, a rearrangement of the second local mathematical expression tree based on the identification of the picked node and the identification of the triggered drop region, and rendering the rearrangement of the second local mathematical expression tree.

Other embodiments of the disclosure may also be characterized as a non-transitory, tangible computer readable storage medium, encoded with processor readable instructions to perform a method for low-latency math expression manipulation, communication, and collaboration across multiple peer devices. The method can include providing a first local mathematical expression tree on a first peer device and a second local mathematical expression tree on a second peer device, wherein renderings of the first and second local mathematical expression trees appear as the same expressions on respective graphical user interfaces of the first and second peer devices. The method can include detecting, at the first peer device, that a user is dragging a portion of the expression, the portion identified as a picked node in the first local mathematical expression tree. The method can include identifying, via the first peer device, a plurality of drop regions in the first local mathematical expression tree. The method can include sending at least an identification of the picked node from the first peer device to the second peer device. The method can include detecting, via the first peer device, a collision between the portion of the first expression being dragged by the user and a first drop region. The method can include sending at least an identification of the first drop region from the first to the second peer device, and in response to the identification of the first drop region and the picked node, animating the second expression. The method can include detecting, via the first peer device, that the user has released the portion of the first expression in proximity to a triggered drop region. The method can include sending at least an identification of the triggered drop region to the second peer device. The method can include determining, via the second peer device, a rearrangement of the second local mathematical expression tree based on the identification of the picked node and the identification of the triggered drop region, and rendering the rearrangement of the second local mathematical expression tree.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIGS. 6A-6E illustrate a series of views of an illustrative expression on a peer device user interface as manipulated by a controlling peer device;

DETAILED DESCRIPTION

Figure 1:
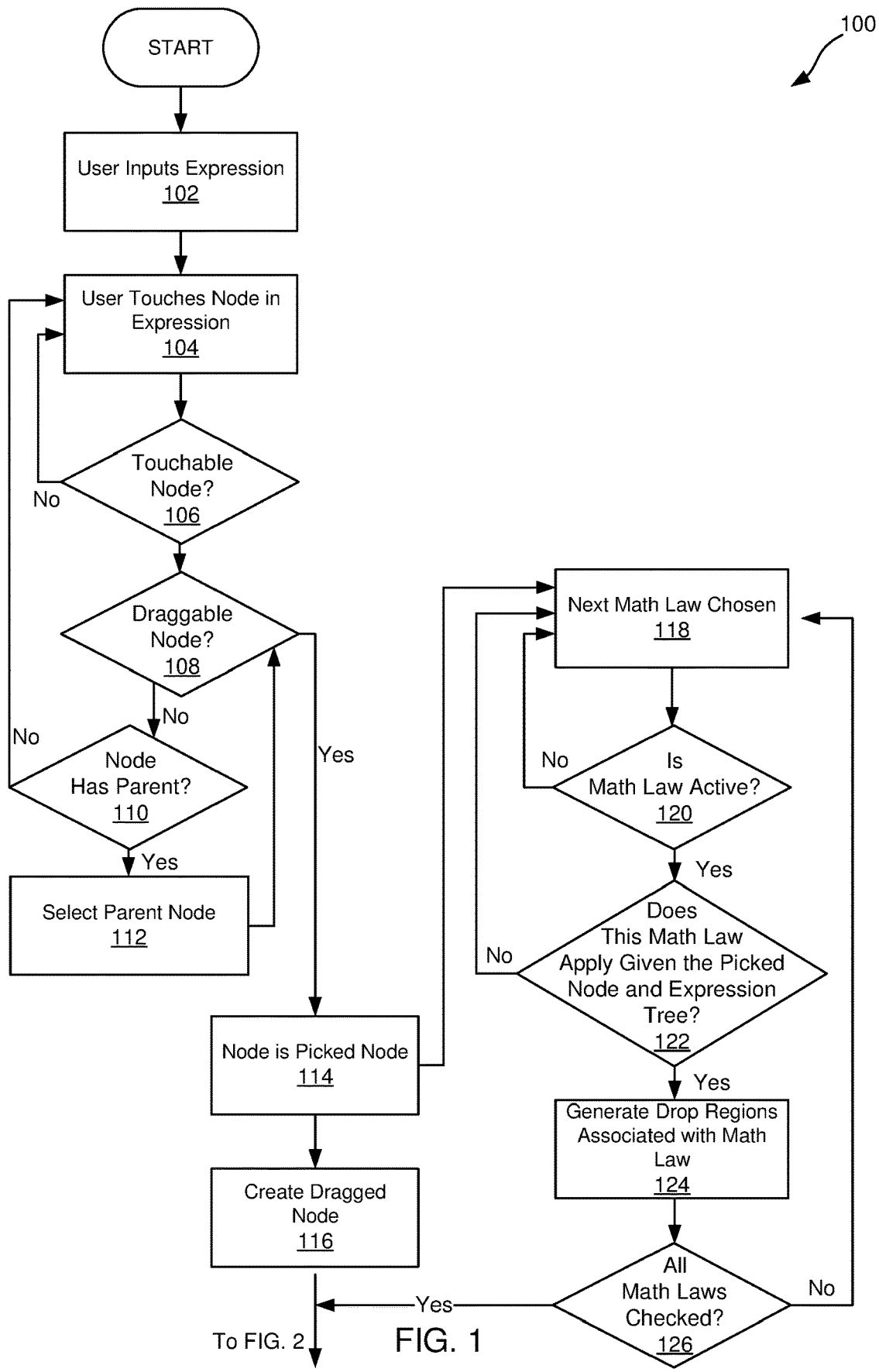
FIG. 1 illustrates a first portion of an embodiment of a method for manipulating an expression on a user interface using the math engine.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although many attempts to provide manipulation of math expressions via the computer have been previously put forward, none of them offer the ability to collaborate in real time with networked peer devices on a common shared expression. Although graphical manipulation of mathematical expressions dates to at least 2006, and various hacks have been put forward for collaboration, no viable (i.e., real time, low latency, and low bandwidth) solution for collaborative sharing, communication, and manipulation of a shared math expressions has been discovered. This is not merely a problem of digitizing the teaching or tutoring of math, but rather a specific technological improvement to existing math manipulation platforms that not only is the first to enable collaboration of this type, but also real-time, lower latency and lower bandwidth collaboration between multiple networked devices.

This disclosure will reference a controlling device and a slave device. However, it should be noted that there may be multiple slave devices. For the sake of clarity and simplicity, this disclosure tends to refer to a single controlling device and a single slave device, though in application multiple slave devices can be implemented without departing from the spirit of the disclosure.

This disclosure describes two primary aspects of a system for collaborative manipulation and communication of mathematical expressions between at least two peer devices. The first is a math engine, unlike a computer algebra system (or CAS), that can monitor user interaction (e.g., via touch) with an expression displayed on a user interface and update the user interface in response. Unlike prior art systems, the math engine can move between sub-steps within mathematical expression manipulation rather than jumping straight to the outcome of a manipulation. This allows users to manipulate expressions in real-time and see the results of different attempts at manipulation and to allow a second user, or a tutor, to watch such manipulations from a second device and/or interact with the same expression via the second device. This process can involve a math engine residing on each of the two or more devices in a peer-to-peer network, and each math engine can be configured to monitor user interface inputs (e.g., touchscreen inputs such as the dragging of a portion of an expression), identify a picked node as the node that a user has started to drag, create a dragged node as a duplicate of the picked node but with a pointer to a user interface object showing a moving location of the portion of the expression being dragged, maintain and update an expression tree used to render the expression on the use interface, add drop regions to the expression tree and render these drop regions on the user interface (e.g., as boxes or circular highlights), assign collision objects to the drop regions, detect collisions between the user's dragged portion of the expression (e.g., the dragged node) and the drop regions, detect a user's release of the dragged portion of the expression (e.g., the dragged node), determine whether the release occurred on or in proximity to a drop region or not, and apply math rules based on the picked node, the drop region where the dragged portion of the expression was released, and the expression tree to rearrange the expression tree, remove drop regions from the expression tree, and render the rearranged expression tree to the user interface.

The second aspect of the system is a peer-to-peer system (P2P system) enabling collaboration between two or more peer devices, with or without the intervention of a server. Furthermore, the P2P system is configured to enable collaboration on the mathematical expression in real time (i.e., low latency) and using a minimum of bandwidth to maintain synced displays between the two or more peer devices. To do this, the P2P system determines a controlling device and slave device via the transmission of timestamps to determine which user was the first to drag a node. Once a controlling and slave device are determined, the controlling device sends less than a full description of the expression tree to the slave device and does so with a frequency less than the frame rate. For instance, the controlling device may send info about the expression tree when three events occur: (1) when the user first begins dragging a portion of the expression; (2) when the user's dragging collides with a collision object; (3) and when the user releases or drops the dragged portion of the expression. By limiting transmission to these three instances, bandwidth is greatly reduced as compared to typical multiplayer gaming platforms, which constantly update a server on a frame-by-frame basis. In some instances, a location of the dragged node can be communicated to the slave device more frequently to allow the slave device to render a location of the dragged node. However, even in this embodiment, the vast majority of information about the full expression tree is not transmitted to the slave device.

By minimizing the amount of data transferred from the controlling device to the slave device, and by running instances of the math engine locally, the herein disclosed systems and methods allow real-time low latency and low-bandwidth collaboration, communication, and manipulation of math expressions between multiple peer-to-peer devices.

The following detailed descriptions of the Math Engine and the P2P system will reference the method figures shown in FIGS. 1-5.

The Math Engine

The math engine gives users the means to explore mathematical expressions and equations even if not completely familiar or comfortable with the basic rules of Algebra. The math engine uses a drag-and-drop style user interface where all mathematical expressions are interactable. Each term in an expression, which is rendered from a node in a local mathematical expression tree separately stored on each device, becomes a manipulative that the user can drag around the expression to trigger a mathematically correct rearrangement or reduction of the expression.

Each expression tree encodes operators such as addition, subtraction, multiplication, division, exponentiation, etc. as binary nodes in the expression trees. Non-binary nodes can also be used, as for instance where unary nodes represent multiplicative inverses, and plus/minus operators. Higher order nodes may be used for functions advanced operators. In addition, the expression tree can be "decorated" with drop regions, which visually aid the user, but do not technically change the expression. An example of a mathematical expression (X=2+3) is illustrated in FIG. 6, while a corresponding expression tree is shown in FIG. 7.

Expression Creation/Input

Figure 3:
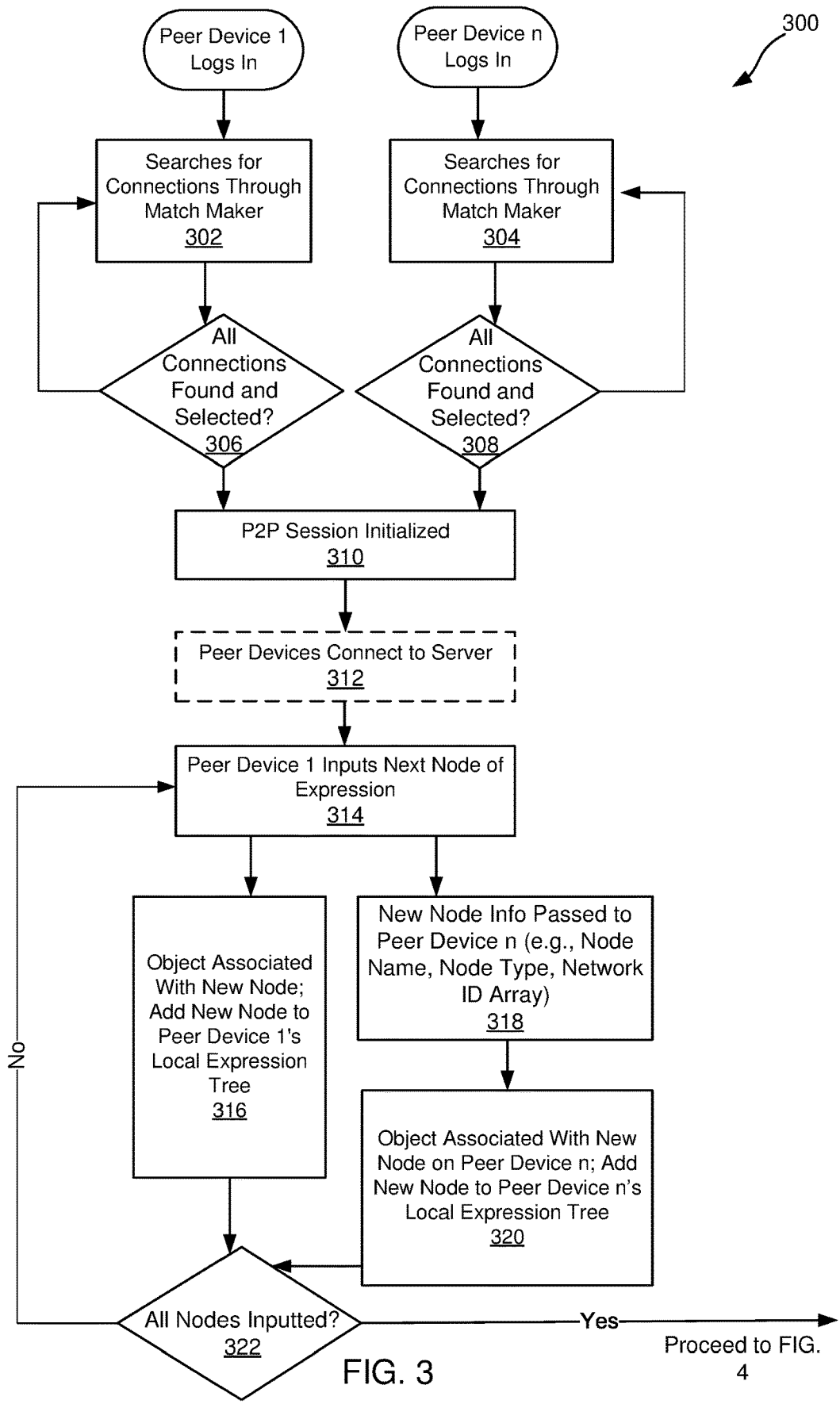
FIG. 3 illustrates a first part of an embodiment of a method for collaborative manipulation of a single expression, or a set of expressions.

A user can create or enter an expression or request loading of a pre-built or previously saved expression or set of expressions (e.g., via a keyboard, touchscreen, or voice commands) (Block 102 in FIG. 1 and Block 214 in FIG. 3). An "input mode" contains a set of algorithms for building a mathematical expression tree (e.g., see FIG. 6) based on user inputs. A rudimentary equation place holder is created by the user (e.g., by double-tapping the background of the work environment) with an empty input-box. The input box serves as a place holder for a node that the user can then input through a virtual keyboard in one embodiment. To identify the location of the new node, a particular node in the local expression tree is chose as the Selected Node. To aid in the flow of seamlessly entering an expression, algorithms can be in place to automatically chose a Selected Node. The user has the option to override the chosen Selected Node by tapping on a valid node in the expression tree. As an example, we will describe the process of inputting the expression x+3=5:

1. User double taps background to create new equation root and Input Box
2. System choses Input Box as Selected Node
3. User types "x" in virtual keyboard
4. System replaces Input Box with "x"-node
5. System choses "x"-node as selected node
6. User inputs "+" in virtual keyboard
7. System creates "+"-node and new "Input Box"-node
8. System rearranges tree with "+" as root node and "x" and "Input Box" as first and second child respectively
9. System choses "Input Box"-node as Selected Node
10. User inputs "3"
11. System replaces "Input Box" with "3"
12. User inputs "="
13. System creates "="-node and new "Input Box"-node
14. System rearranges local expression tree so "=" is root node, "x+3" sub-tree is first child, and "Input Box" is second child
15. System choses "Input Box" as Selected Node
16. User inputs "5"
17. System replaces "Input Box" with "5"-node If the user is finished entering expressions, they then can indicate that they are ready to manipulate the expression or expressions. The math engine checks that the expressions are complete (there are no residual input boxes) and enters a "Manipulate Mode" and prepping the system for manipulation.

Each node in the tree is equipped with a set of labels and scripts to uniquely define the type of node. For example, the "+" operator is defined with the generic tag "binaryNode" to identify its generic type. The "+"-node is an object with attached scripts that are part of the math engine's type system for precisely identifying node types. The math engine's type system can include a set of classes with an inheritance structure to narrow down the type of math object the node is. For example, the "+"-node has a class "ADDITIVE BINARY OPERATOR" with the following class inheritance structure to narrow its type:

MATH NODE→OPERATOR→BINARY OPERATOR→ADDITIVE BINARY OPERATOR

In addition, each movable node in the local mathematical expression tree can be assigned an interaction target. The interaction target registers touch and drag events on the node, as well as collision events between different objects (e.g. a dragged node moving over a node in the local mathematical expression tree).

Manipulation of the Expression

The math engine is encoded to operate with a drag-and-drop user interface. In contrast to typical Computer Algebra Systems (CAS's), which are designed to accomplish a given task on a mathematical expression such as "Simplify" or "Solve", the herein disclosed math engine offers more open and flexible operation including the ability to react to and animate a user interface in response to step-by-step user inputs. To accomplish this, the math engine includes a set of atomic mathematical laws referred to as "Modular Mathematical Manipulations" (MMM's) that can be chosen to reflect the axioms of algebra and the stepwise processes that one employs in a mathematical derivation that is typically done with pen and paper.

A typical MMM facilitates two processes:
Process 1: Generate Drop Regions
Inputs:
The Mathematical Expression Tree(s) being manipulated
The Picked Node chosen by the user to initiate the manipulation
Outputs:
Drop regions associated to the MMM
The Mathematical Expression Tree(s) "decorated" with these Drop regions
Process 2: Rearrange Expression Tree
Inputs:
The Mathematical Expression Tree(s) being manipulated
The Picked Node chosen by the user initiating the manipulation
The Drop region chosen by the user to define the manipulation Outputs:
The rearranged Mathematical Expression Tree(s)

After Process 2, the rearranged tree or set of trees can be passed to a repositioning algorithm and animated to their final form. As an example, consider the expression $(a \cdot x + a \cdot y)$. Suppose the user choses the left-most "a" in the expression. The left-most "a" in the expression is the Picked Node. The system then generates a "Dragged Node" (the details of which will be described below) to serve as the pointer object to trigger Drop regions (Blocks 116 and 436). In this case the local mathematical expression tree and picked node meet the conditions of two MMM's, namely:

MMM1: Multiplicative Commutative Law
MMM2: Multiplicative Factor Out Law
MMM1 facilitates the rearrangement $(a \cdot x + a \cdot y) \rightarrow (x \cdot a + a \cdot y)$, whereas MMM2 facilitates the rearrangement $(a \cdot x + a \cdot y) \rightarrow a \cdot (x + y)$.

Once the Picked Node is chosen (Block 114) and the Dragged Node created (Block 116), the math engine cycles through the set of active MMM's (Blocks 118, 120, 122, 124, 126). The math engine is designed to be modular so each MMM's can be deactivated at will without affecting the remaining active MMM's (e.g., where a teacher or tutor wants to limit the MMM's that can be applied to a given situation). Each active MMM checks that the conditions for application of the atomic law are met given the local mathematical expression tree(s) and Picked Node (Decision 122). If the conditions are met, the MMM then proceeds to Process 1 to generate Drop Regions (Blocks 124 and 440).

The Drop regions are chosen to reflect different loci where the math engine could be triggered to initiate a rearrangement of the expression. Typically their position within the tree-structure is suggestive of where the user may want the Picked Node to end up after the end result of a manipulation. In this case there is one drop region associated with MMM1 and there are two Drop regions corresponding to MMM2. The drop region associated with MMM1 is generated to the right of the left-most "x" in the expression and is embodied by an Interaction Target object attached to the decorated tree structure (tree structure decorated with drop regions) as a child of the "x"-node. The two drop regions associated with MMM2 are generated to the left and right of the bounding parentheses and are attached in the decorated tree as two Interaction Targets that are children of the "Parentheses"-node.

Drop regions can be rendered on the user interface, e.g., as highlighted boxes or lights. The user can drag the dragged node around the expression on the user interface (Block 128), and when the dragged node collides with a drop region (Blocks 130 and 445) the expression may be animated such that the expression expands around the drop region to visually indicate that the expression is ready to accept a drop or release of the dragged node (Block 132). This animation of the expression can be accomplished without changing or rearranging the local mathematical expression tree. The drop region can also flash and/or be accompanied by an audible indictor. If the user were to release the dragged node while the drop region is triggered (Block 138 and Decisions 140 and 446) this would initiate Process 2 of the MMM corresponding that particular drop region (Blocks 144 and 152). This drop region can be referred to as a triggered drop region.

It should be understood that a collision object associated with each drop region can be the same size as the drop region seen in the user interface or can be larger than the visualized drop region. In other words, collision with a drop region can occur when a drop region collides with a drop region, or when a dragged node is merely in proximity to a drop region. When the dragged node is dropped or released, the math engine can pull the dragged node into the center of the drop region.

Where the user drops the "a" in the vicinity of the left drop region of MMM2 (Block 138 and Decisions 140 and 446), the math engine would initiate Process 2 of MMM2 and rearrange the local mathematical expression tree according to this atomic law (Blocks 144, 152, 452, and 460). New nodes are created where needed and deleted as needed. The Picked Node is set to Null, and the Dragged Node is deleted. The resulting rearranged Mathematical Expression Tree is then fed into the math engine's repositioning algorithm to determine the final positions of the nodes in the tree. The nodes in the tree are then animated to the final positions to visually display how the expression morphs and changes as a result of the manipulation (Blocks 154 and 460).

Selection of Picked Node and Creation of Dragged Node

A sub-process of the process described above is the selection of the Picked Node and the creation of the Dragged Node. Most nodes in the local mathematical expression tree are touchable nodes by default. Practically this means they can be assigned an interaction target to register touch and drag events. Being touchable is a static property of the node. On the other hand, not all touchable nodes are draggable nodes, and the "draggable" property is not static but depends on the local environment of the node. For example, consider the expression $x^2 + 3 \cdot x$. In this case, both "x"-nodes are touchable nodes, but only the right-most "x" is draggable.

The left-most "x" is not by itself draggable, rather it is the offspring of a draggable node. The math engine chooses the draggable node depending on the context. In this case, when the user touches the left-most "x", the math engine recognizes that it is the child of an exponentiation node and searches up the tree for the draggable node. Here the draggable node is the "Exponentiation"-node which contains the "x" and "2" as children. The "Exponentiation"-node is chosen as the picked node (Block 114) and the Dragged node is constructed from it (Blocks 116 and 436).

Another example of a touchable node that is not draggable is found in "grouped" subexpressions. The math engine has a "Grouping Mode" which allows the user to select a subexpression of the local mathematical expression tree and treat it as a unit when manipulating the expression. The grouping algorithm may itself rearrange the local mathematical expression tree temporarily to appropriately isolate the intended grouping as a subexpression. If the user attempts to drag any node within a grouped subexpression, the math engine will choose the top node of the subexpression as the Picked Node, which will then be the draggable node on which the dragged node is constructed.

The dragged node can be a clone of the subexpression with the picked node as a root. Upon dragging, the math engine can choose the picked node which is then cloned to create a dragged node. The dragged node is "cleaned" from its picked node counterpart to remove Interaction Targets and scripts that may conflict with the process. The dragged node may be equipped with a "Pointer" that acts as the triggering mechanism as it interacts with the drop regions. In practice, this "Pointer" is a root node with a small target attached to it. When the Pointer interacts with a drop region via their respective targets, that drop region is triggered.

In some embodiments, a dragged node can be omitted.

Figure 2:
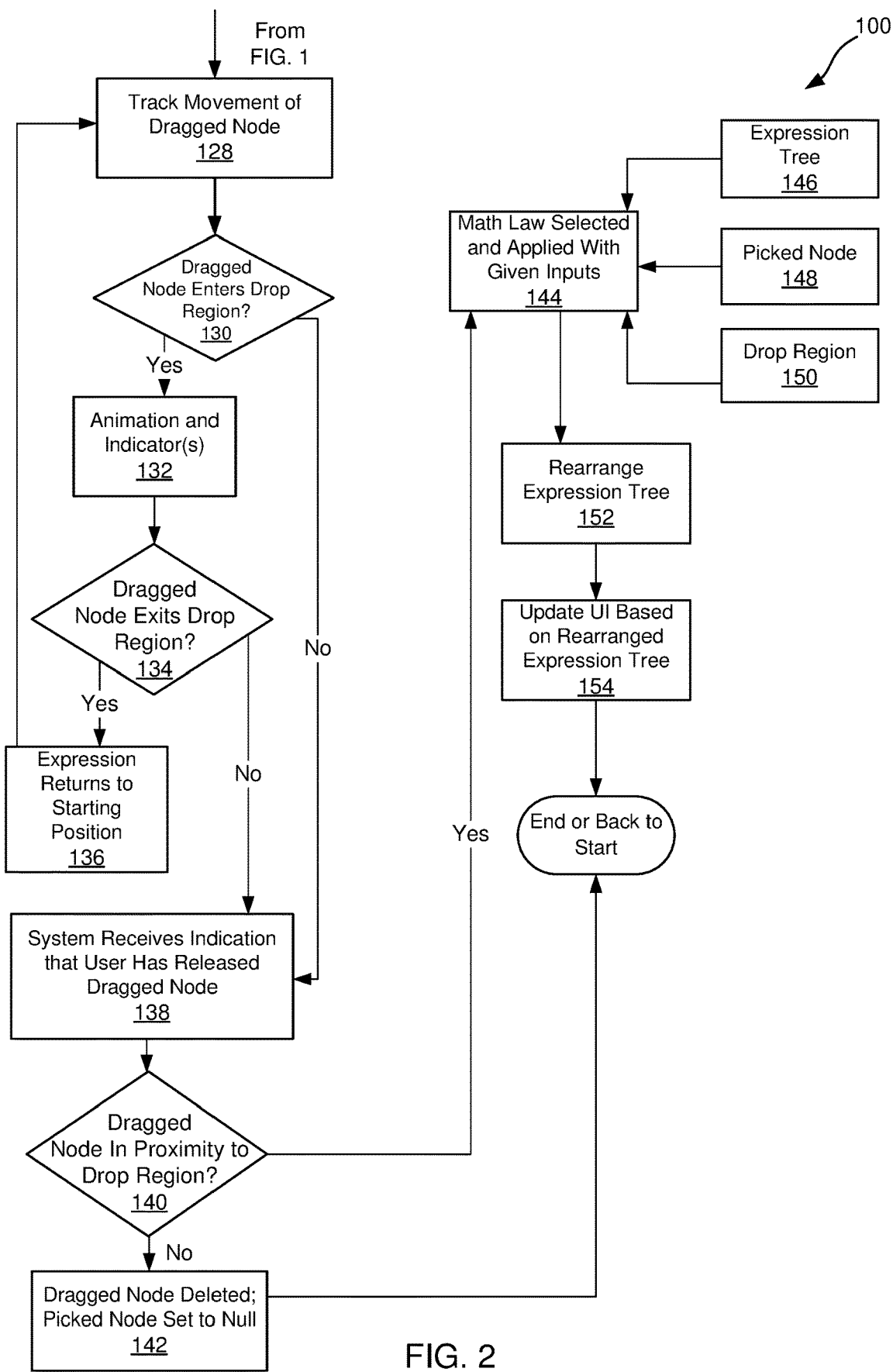
FIG. 2 illustrates a second portion of the embodiment of the method of FIG. 1.

FIGS. 1-2 illustrate a method 100 for manipulating an expression on a user interface using the math engine. The method 100 can start with the user inputting or entering an expression (Block 102). In an embodiment, the user can access or request a saved expression (Block 102). The user can then touch a portion of the expression (e.g., a node in the local mathematical expression tree) (Block 104). The math engine can determine if the node is touchable (Decision 106) and if not, the math engine can continue monitoring the user's touch gestures (Block 104 and Decision 106) until the user touches a touchable node. The math engine then determines if the touchable node is a draggable node (Decision 108). If not, then the math engine determines if the draggable node has a parent (Decision 110). If the draggable node does not have a parent (e.g., an "=" node in an expression typically does not have a parent), then the math engine returns to monitoring for a touchable and draggable node (Blocks 104 and Decisions 106, 108). If the non-draggable node has a parent (Decision 110), then the math engine selects the parent node (Block 112) and determines if the parent node to the non-draggable node is draggable (Decision 108). This analysis continues until the math engine finds a node that is draggable (Decision 108) and selects this as the picked node (e.g., 702 and 802 in FIGS. 7 and 8, respectively).

The math engine can create a dragged node from the picked node (Block 116) as discussed above. For instance, the dragged node can be a 'cleaned' copy of the picked node, and can be used to track the movement of the portion of the expression that the user is dragging across the user interface.

At the same time, the math engine can generate drop regions based on the picked node (Blocks and Decisions 118, 120, 122, 124, and 126). First, a first or next math law (e.g., MMM) can be selected (Block 118) and the math engine can check to see that the math law has been activated (Decision 120). Recall that a user such a tutor or teacher can disable certain of the math laws or MMM's. The math engine steps through math laws until an active one is found (Decision 120) and then determines if the selected active math law applies given the picked node and the local mathematical expression tree (Decision 122). The math engine cycles through the math laws until an active and applicable math law is found (Block 118 and Decisions 120 and 122). When an active and applicable math law is found, the math engine generates drop regions based on the math law. Exemplary drop regions can be seen as D1-D5 in FIGS. 6C and 7C. Once all the math laws have been checked and corresponding drop regions created, the math engine moves to FIG. 2.

Figures 6A, 6B, 6C, 6D, 6E:
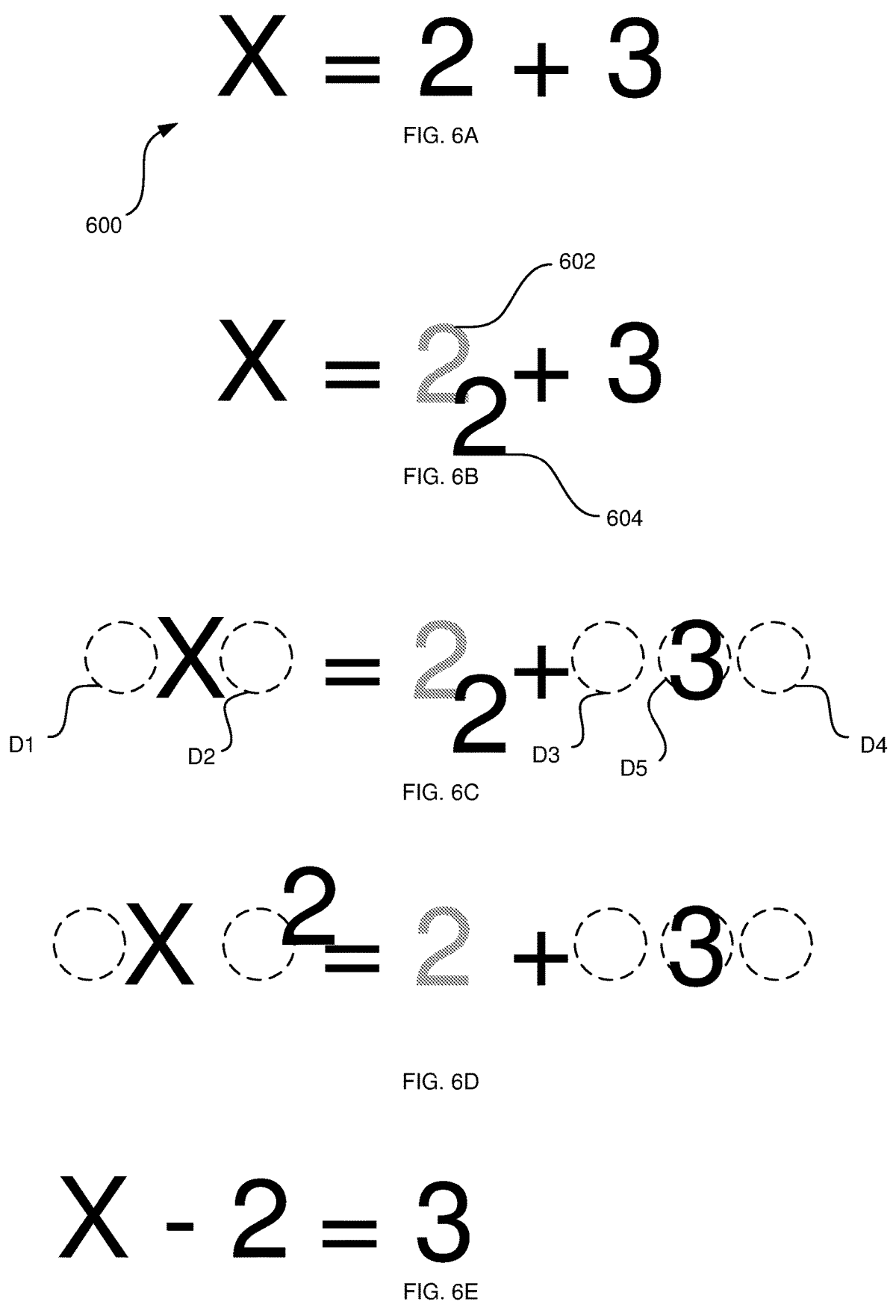
Figure 7A:
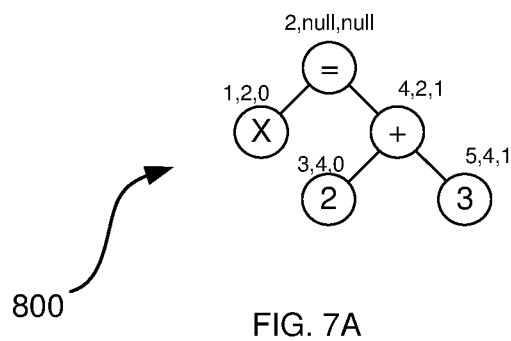
FIGS. 7A-7D illustrate a series of views of an illustrative local mathematical expression tree used to render the expression of FIGS. 6A-6E.
Figure 7B:
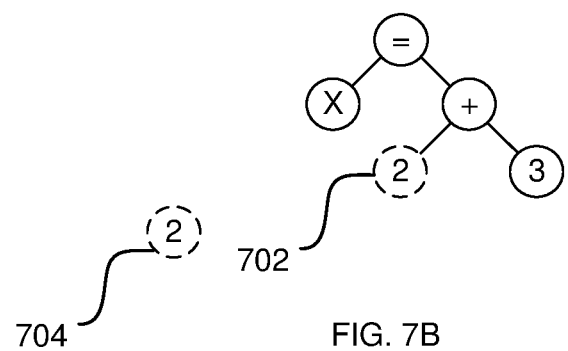
Figure 7C:
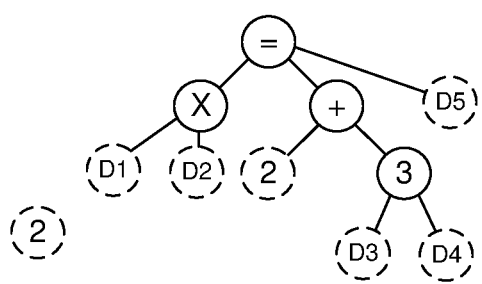
Figure 7D:
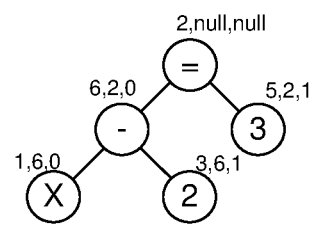

The math engine can continue to monitor movement of the dragged node (Block 128) (i.e., monitor touch indications from a touchscreen). When the dragged node collides with a drop region (Decision 130) the math engine can animate the expression to indicate that the dragged node can be dropped (Block 132). For instance, the math engine can expand the expression around the drop region, generate an audible indicator, cause the drop region to flash, or any combination of these. If the user does not drop or release the dragged node (i.e., the dragged node exits the drop region) (Decision 134), then the math engine may again animate the expression, for instance by returning the expression to its previous state. If the user drops or releases the dragged node outside or not in proximity to a drop region (a triggered drop region) (Decision 140), then the math engine can delete the dragged node and set the picked node to null (Block 142) and return to monitoring user inputs (Block 104). If dropped within or within proximity to a drop region (Decision 140), then the math engine can select and apply one of the math laws (or MMM's) (Block 144) based on the local mathematical expression tree (146), the picked node (148), and the drop region (150). The math engine can use the math law or MMM to rearrange the local mathematical expression tree (Block 152). FIG. 7D shows rearrangement of an expression tree when a dragged node is dropped within or within proximity to a drop region (triggered drop region). The math engine can then update the user interface (e.g., animate the expression) based on the rearranged expression tree (Block 154) and return to monitoring user inputs (Block 104). FIG. 6E illustrates rearrangement of the expression based on the rearranged local mathematical expression tree of FIG. 7D.

The Peer-to-Peer System

Market and customer research reveals a critical need for better tools for communicating technical content when the participants are not in the same physical location. In educational settings it often occurs that two people need to communicate, say, the process of a mathematical derivation when they are not in the same place. This occurs, for example, when students study in remote study groups, when teachers interact with students outside of the classroom, and when students connect with tutors through an online tutoring platform. Traditional communication methods lack the features needed to communicate math content in a satisfactory way. Consequently, students, teachers, and online tutors have resorted to hacking their way to mostly unsatisfactory solutions. For example, when students study together in remote study groups, they often do a calculation on paper, take a picture of it with their mobile phone, and send it to a fellow student or tutor who then repeats the process to send back a response. This process is tedious and time consuming, and often results in the students giving up on trying to communicate math content remotely. Teachers often communicate with students outside of the classroom via email where they attempt to write equations and math derivations using standard ASCII text. Beyond being a tedious and time-consuming process as well, this method often results in miscommunications as there is no standardized way of writing equations with plain text that both students and teachers are familiar with. Online tutoring platforms use a combination of these methods usually packaged together in a proprietary Interactive Online Whiteboard system. These systems suffer from the same problems. Many tutors attempt to point their webcam at their sheet of paper while doing derivations, usually resulting in frustration on both sides, and some companies have resorted to sending expensive "Skycams" to their higher paying customers so they can see what the students are doing in real time. Some examples of existing and unsatisfactory attempts to solve this collaboration challenge include MathChat, Pearson Smarthinking, Wyzant, Tutor.com, TutorVista, and Chegg.

Another aspect of this disclosure solves these problems by creating an intuitive and easy method for collaborative manipulation of mathematical expressions on at least two separate client devices, where real-time manipulation of mathematical expressions can be shared between the at least two client devices with or without a server between the at least two client devices. For the purposes of simplicity, only two client devices will be referred to hereafter, but those of skill in the art will be able to apply this description to three, four, or more client devices without undue experimentation. This aspect of the disclosure will be referred to as a Peer-to-Peer System, or the P2P System, and methods for implementing the P2P system can be seen in FIGS. 3-5.

The P2P System is a networking layer that can be built on the framework of the math engine described above to facilitate mathematics communication and collaboration between multiple users on multiple computing devices.

Advantages of the Peer-to-Peer System

Research shows that math students learn best when they are actively engaged with the content as opposed to passively absorbing material. This is especially true in online tutoring where the most effective tutors have a rapid back-and-forth engagement with the students. Simple screen-sharing or analogous solutions are not sufficient for math communication for the reasons discussed above, and they do not facilitate active-learning. Thus, the P2P system achieves user control of a shared expression at any given time and rapid switching of control of the shared expression between two peer devices.

The P2P system is configured for application to a variety of network architectures. For instance, the P2P system can be a plugin within an online tutoring platform's learning environment, or within the Local Area Network (LAN) of an education institution. In the former case, the online tutoring platform would likely have its own existing servers and network architecture, while in the latter case, the LAN architecture may entail a server-less implementation. Accordingly, the P2P system can be server-less (i.e., a server plays little or no role). Insofar as there is a server in an implementation, it simply serves as a conduit through which information passes—the server does not perform the role of a centralized processing system, and all processing is performed locally on the peer devices. The examples in this disclosure discuss a server-less implementation. However, those of skill in the art will appreciate that a server can be arranged as a communications intermediary between the peer devices even though processing resources are primarily arranged locally on the peer devices.

The inventors initially turned to traditional multiplier online game platforms and software architectures to realize their vision of a real time peer-to-peer mathematical manipulation collaboration platform. However, the server-based solutions provided by expert programmers saw excessive latency, that would have hampered real time collaboration between users of the P2P system. The inventors speculate that this was due to server-based approach to multiplier gaming, where a server maintains a log of all objects, performs most of the processing, and passes unique rendering instructions to each client for rendering to client displays (i.e., processing is server-centric). While this approach is preferred for most games, in the context of collaborative manipulation of expressions, it causes untenable delays that impair the user experience.

Math communication demands rapid communication and display of mathematical derivations in real time. Noticeable latency times would significantly reduce the effectiveness of the communication, especially as the communication is usually accompanied by verbal communication. To overcome the latency challenges of traditional multiplier gaming platforms, the inventors discovered that moving to a client-centric or peer-to-peer platform, could improve latency. In some cases, the server could be removed entirely.

Yet, this was not the only challenge. Education entities are notorious for having tight budgets. As most networked systems are charged per megabyte of data transferred, it is critical to keep the data transfer minimized. Standard multiplayer game platforms are excellent environments for building a math communication system, however, the server-centric nature of these platforms and the transfer or large quantities of data between the server and clients is not desirable in an education setting where bandwidth budgets are limited. By performing most of the processing on the peer devices, and only transferring a minimum of information between peer devices, this disclosure achieves much reduced bandwidth expenditures as compared to multiplier gaming platforms.

Details of the Peer-to-Peer System

To achieve low-latency and low bandwidth peer-to-peer collaboration, the P2P system generates a set of identifications (ID's) to identify the nodes within the local mathematical expression trees, and shares just enough information across the network to allow peer devices to independently perform their own rearrangement of a local mathematical expression tree stored on and manipulated on each peer device. In an embodiment, the peer devices merely transfer an identification of a picked node and a drop region where a dragged node or dragged portion of the expression is dropped/released. Identification of a collision object triggered between the dragging and dropping can also be transferred. In an embodiment, each node can have three ID's to identify the node in various contexts: (1) a node type; (2) a local ID; and (3) a network ID array. When sharing information about a node or tree structure, only the network ID array need be transferred. For instance, it is sufficient to transfer a network ID array for the picked node, network ID array for any collision objects that the dragged node collides with, and network ID array of the drop region where the dragged node is dropped/released.

The node type can be a generic ID that identifies the type of node on a given peer device. For instance, given the node of the additive binary operator "+", the math engine can identify this node with a node name (e.g., "+"), a node tag (e.g., "binaryNode"), and an ID of the math type (e.g., "Additive Binary Node"). However, the node type may not be unique since there can be multiple nodes with the same node type (e.g., there can be multiple "+" nodes). A peer device receiving the node name can construct the node tag and ID of the math type from the received node name (e.g., node tag and ID of the math type) thus reducing the amount of data that need be transmitted between peer devices. The node type is locally created and does not need to be shared during manipulation unless a node is created. The node type is transmitted with the network ID array when a node is created, either at expression entry or when manipulation causes a new node to be created. In other instances of manipulation, the node type need not be transmitted with the network ID array.

The local ID can be an identification of the node in a local workspace (i.e., local to each peer device). For instance, the local ID can be an identification of a stored location of a node in local memory. Consider the equation x+3*x=4. Both "x"'s in this equation will have identical node type's, but different local ID's. However, to distinguish the left "x" from the right "x", and given that this information is used locally on each peer device, it is sufficient to distinguish each "x"-node by the object Class defining the node in the Object Oriented Programming framework. The local ID is locally created and not shared between clients.

The network ID array can be the identification of nodes across the network, and thus the network ID array may be passed between peer devices. In an embodiment of the P2P system, two connected peer devices can be connected through a shared workspace interface. In the shared workspace, each user can have instantiations of local mathematical expression trees that are mirrored on all the connected peer devices. To identify the different instances of the nodes across the network, each node has a network ID array. For example, if Alice and Bob are connected through the P2P system and they share a workspace with a single equation, "x=3", both Alice and bob will have an instantiation of the mathematical expression tree corresponding to "x=3" on their devices (each instantiation is referred to as the local mathematical expression tree). To signify that these are two separate instantiations, each of the nodes will share the same network ID array (i.e., "x" will have the same network ID array on both Alice and Bob's devices, "=" will have the same network ID array on both devices, etc.). This is in comparison to the local ID, which may differ for a same node on Alice and Bob's peer devices. Unlike the node type and local ID, the network ID array can be passed between peer devices to sync newly-created nodes and/or to sync changed nodes.

As an example, consider the rearrangement of the expression x=2+3→x−2=3 depicted in FIG. 6. This type of rearrangement would occur during a manipulation, but the process would also be used to input/enter/create an expression. The information about each node both before and after the manipulation is summarized as follows:

| Node Name | Node Tag | Network ID | Network ID of Parent Before | Sibling Index Before |
|---|---|---|---|---|
| "x" | Variable | 1 | 2 | 0 |
| "=" | Binary Operator | 2 | null | null |
| "2" | Number | 3 | 4 | 0 |
| "+" | Binary Operator | 4 | 2 | 1 |
| "3" | Number | 5 | 4 | 1 |

| Node Name | Node Tag | Network ID | Network ID of Parent After | Sibling Index After |
|---|---|---|---|---|
| "x" | Variable | 1 | 6 | 0 |
| "−" | Binary Operator | 6 | 2 | 0 |
| "2" | Number | 3 | 6 | 1 |
| "=" | Binary Operator | 2 | null | Null |
| "3" | Number | 5 | 2 | 1 |

In this example, the "+" node is destroyed and a new "−" node is created. When node deletion and creation occurs during manipulation, the new node's network ID array includes a new network ID, "6" in this case, and the network ID of the destroyed node, "4" is deleted. The Sibling Index indicates which child (or sibling) a node is (e.g., first child or second child). The Sibling Index can be "1" or "0" in an embodiment, depending on the side of the binary parent that a child node resides on ("1" for left and "0" for right). For instance, for a first child (node to left of a binary node), the Sibling Index=0. For a second child (node to right of binary node), the Sibling Index=1. The "Before" and "After" columns of the above charts can be correlated with FIGS. 7A and 7D, respectively, where the network ID array for each node is shown just to the right top of each node. Each time that information about the tree structure is to be passed between peer devices, the P2P system can send the following network ID array, and the receiving peer device can reconstruct or update its local mathematical expression tree using the received network ID array:

{Network ID of node, Network ID of node's parent, Sibling Index}

With this structure, a multi-dimensional array or set of arrays, can be passed from a controlling peer device to the one or more slave peer devices, where the array(s) can have the following structure for the local mathematical expression tree of FIG. 7:

Array Before Rearrangement (FIG. 7A):
{{1,2,0}, {2,null,null}, {3,4,0}, {4,2,1}, {5,4,1}}
Array After Rearrangement (FIG. 7D):
{{1,6,0}, {2,null,null}, {3,6,1}, {6,2,0}, {5,2,1}}

While this array and meta-information, such as the network ID array of the picked node and network ID array of the drop region where the user dropped/released a dragged node, is sufficient to convey changes in the mathematical expression tree to slave peer devices, to achieve even lower bandwidth usage, merely the network ID array of the picked node and the network ID array of the drop region can be conveyed (i.e., the array describing the mathematical expression tree need not be transmitted). In such a case, the receiving slave peer devices can reconstruct a local mathematical expression tree based on an initial local mathematical expression tree plus the network ID array of the picked node and a network ID array of the drop region. Each time information is received by a slave peer device, that slave peer device can rearrange its local mathematical expression tree, if appropriate, and recolor, resize, and animate the expression rendered from the local mathematical expression tree. For instance, where the dragged node collides with a drop region, but is not dropped, the controlling peer device may pass a network ID array of the drop region where the collision occurred, and the slave peer device(s) may merely recolor, resize, and animate the expression (no tree rearrangement is needed until the user drops/releases the dragged node in or proximal to a drop region).

While the network ID array has been described and illustrated as an array, it can also take on other structures. For instance, the array can be replaced by a single value or string (e.g., instead of a network ID array "(1,2,1)", a value or string "121" could be passed).

Conflict Resolution

Peer devices may take turns entering expressions in the shared work environment (i.e., may take turns as the controlling peer device). Authority is granted dynamically as described above so that only one peer device is capable of entering an expression at a given time. Once all expressions are entered, one peer device can indicate a switch of the P2P system to a Manipulate Mode to initialize the manipulation process (e.g., Block 424). Before initialization, the P2P system can check that the expression is ready for manipulation (e.g., there are no remaining input boxes) and the P2P system initializes Manipulate Mode by activating the appropriate manipulation scripts.

Given that Manipulate Mode can take place within a server-less architecture, there is a need for conflict resolution when two or more peer devices attempt to manipulate the expression within a time window small enough that the two or more competing peer devices cannot inform one another of the competing action until the other has already started of manipulation (i.e., dragging a node). Typical networked environments deal with conflicts by using a server as the moderator. For instance, users Alice and Bob could be connected through a server and share a workspace with a single equation "a+b=2". Suppose Alice begins to drag the "a" and Bob begins to drag the "b" in a time window small enough that Bob could not be notified that Alice had already begun manipulating the equation. One of the two users can be blocked from such competing manipulation until it is safe to begin a new drag event or the controlling peer device indicates that it has completed manipulation. In a typical server-centric architecture, this would be accomplished by sending both signals to the shared server, and the server would arbitrate the inputs and accept only the first-to-arrive drag event while blocking the second drag event. The processing would be performed on the server itself, and information about the outcome of the drag event would be relayed back to Alice and Bob simultaneously from the server. However, in the current P2P system, lacking a centralized server architecture, this server-based arbitration is not possible.

The herein disclosed P2P system resolves conflicts (Block 434) by using timestamps to prioritize events. Specifically, a timestamp can be sent along with node information for each drag, collision, and drop/release event. For example, if Alice and Bob both begin dragging a node on the same equation before either is notified through the P2P System that the other has started dragging, both Alice and Bob send the other a timestamp indicating a start of each's respective drag event. When Alice receives Bob's timestamp, her peer device can compare Bob's timestamp to her own and locally determine whether she or Bob should be the controlling peer device. Where Alice's timestamp is earlier than Bob's, Bob's peer device will immediately cancel any manipulation that Bob has already made and return his expression to its state before Bob began dragging. At the same time, Alice's peer device would continue to allow Alice to drag the node and would make her the controlling peer device. Each peer device would continue this controlling-slave relationship until each received indication that Alice's manipulation is complete.

Figure 8:
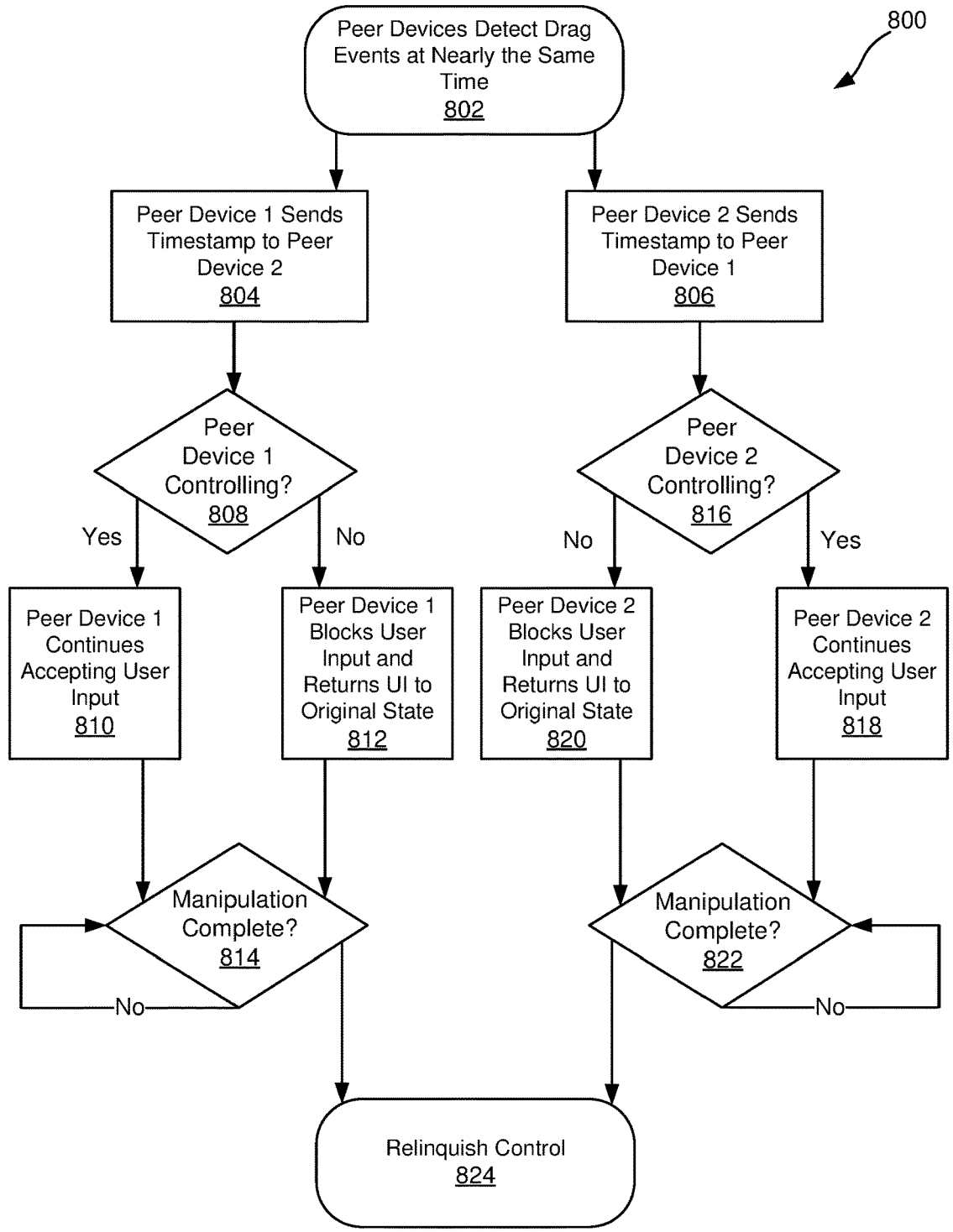
FIG. 8 illustrates an embodiment of a method for conflict resolution between peer devices when multiple users attempt to manipulate a shared expression at nearly the same time.

FIG. 8 illustrates a method of conflict resolution (e.g., one detailed embodiment of an implementation of Block 434). In the method 800 both peer device 1 and peer device 2 begin to receive dragging inputs from their user interfaces at nearly the same time (Block 802). At the start of each drag event, peer device 1 sends a timestamp to peer device 2 along with a network ID array for its picked node (Block 804), and peer device 2 sends a timestamp to peer device 1 along with a network ID array for its picked node (Block 806).

Upon receiving the timestamp and network ID array from peer device 2, peer device 1 compares the timestamp to its own timestamp and determines whether it is the controlling client (Decision 808). If so, then it continues to respond to the user's dragging of the picked node (Block 810). If not, then peer device 1 blocks further user input and returns the expression to its state before manipulation started (Block 812) until peer device 2 completes manipulation (Decision 814).

Peer device 2 performs this same conflict resolution independently of peer device 1. Upon receiving the timestamp and network ID array from peer device 1, peer device 2 compares the timestamp to its own timestamp and determines whether it is the controlling client (Decision 816). If so, then it continues to respond to the user's dragging of the picked node (Block 818). If not, then the peer device 2 blocks further user input and returns the expression to its state before manipulation started (Block 820) until peer device 1 completes manipulation (Decision 822).

It should be noted that while only two peer devices are illustrated, this conflict resolution can be implemented amongst any number of two or more peer devices.

Input with the Peer-to-Peer System

Figure 4:
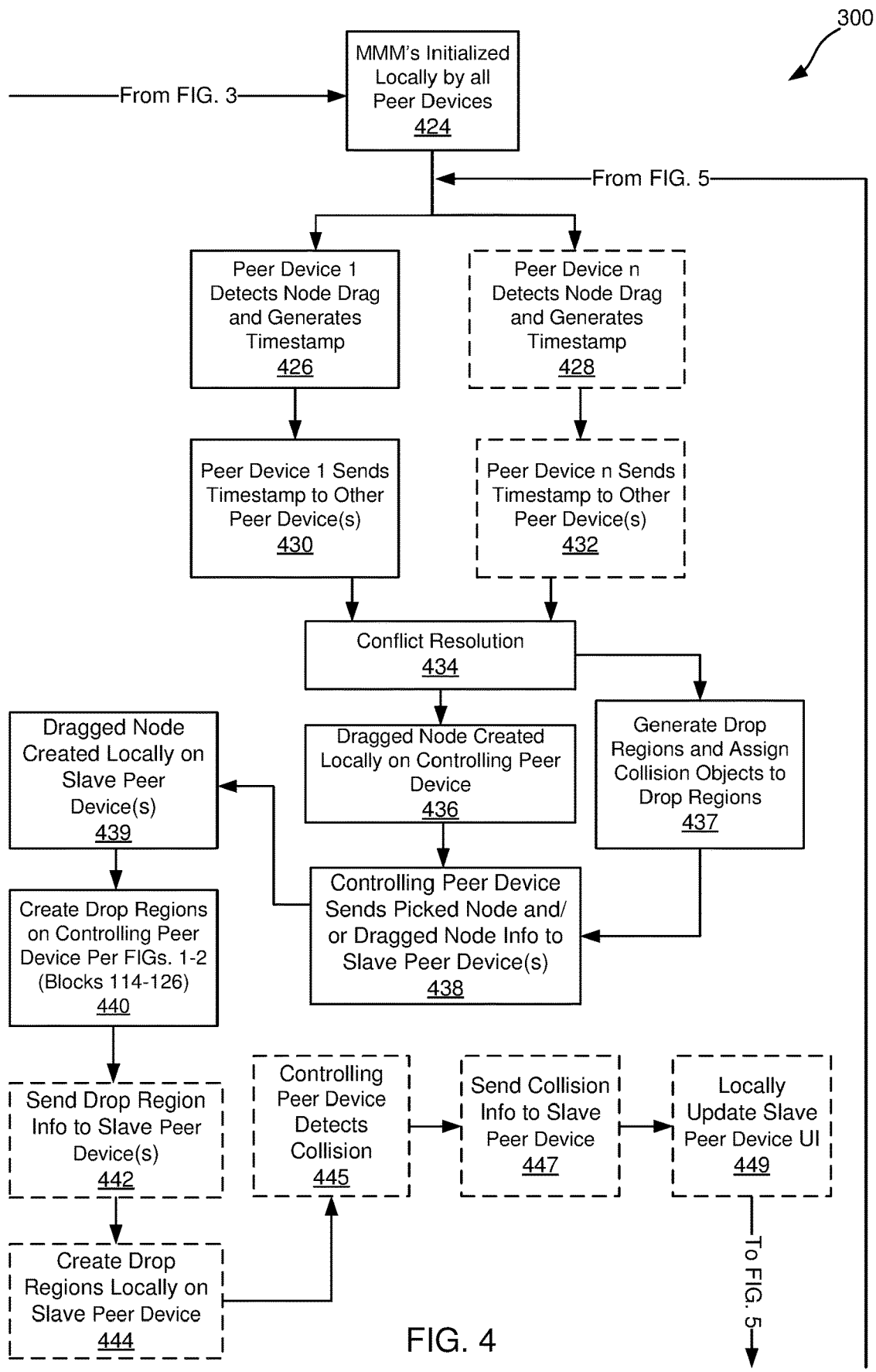
FIG. 4 illustrates a second part of the embodiment of the method of FIG. 3.
Figure 5:
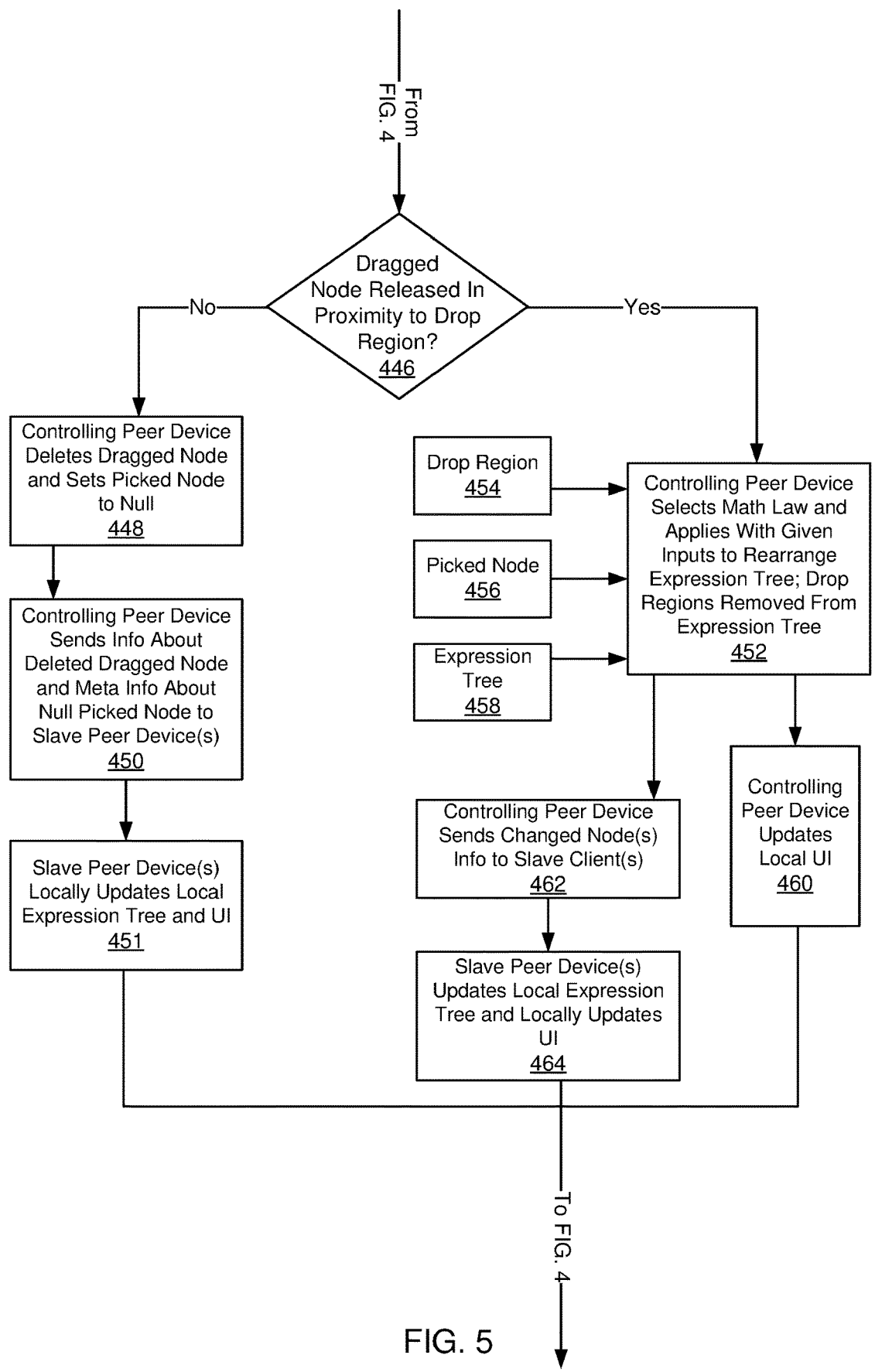
FIG. 5 illustrates a third part of the embodiment of the method of FIG. 3.

FIGS. 3-5 illustrate a method 300 for collaborative manipulation of a single expression, or a set of expressions, across multiple user devices where application of math laws and rearrangement of local mathematical expression trees is performed locally on each peer device. The method 300 can be applied to two or more peer devices, and as such, "peer n" represents any number of peer devices ("n" being a positive integer). FIG. 3 is associated with expression input while FIGS. 4-5 are primarily related to collaborative manipulation of an expression. For expression creation, the node name and network ID array of each created node can be passed to other peer devices. When a node is created on the controlling peer device, the controlling peer device can assign a network ID array to the newly created node. These two pieces of information alone are sufficient to allow other peer devices to generate and update their local mathematical expression trees to reflect newly-created nodes on the controlling peer device.

The method 300 can begin with each peer device login in and the P2P system searching for connections for each peer devices through a match maker module (Blocks 302, 304). Once all connections are found for each peer device (Decisions 306, 308), the P2P system can initialize a P2P session (Block 310). Where a server is used as an intermediary between the peer devices, though not as a primary processing component, the peer devices can connect to the server (optional Block 312).

Peer device 1 can input a first or next node of an expression (Block 314) and associate an object with the new node (Block 316). The P2P system can also create a new node within an existing tree, or if this is the first node to be entered, then a new tree can be created (Block 316). This can continue until the user of peer device 1 has entered all nodes (Decision 322).

Expression input in the P2P system passes minimal information about the input between peer devices to minimize bandwidth and increase speed. The system uses various tags and labels to describe the state of the system at the present time. These include the selected expression (the expression that is highlighted for input or manipulation when there are multiple expressions to choose from), the selected node (the node that is highlighted to be actionable), and the various modes of the system and/or selected expression (includes "Input Mode", "Manipulate Mode", "Group Mode"). These can be synced between peer devices by passing minimal information about the change of these parameters and allowing local processing of these parameters on each peer device independently. For example, when a selected node is chosen, that node and its children can be highlighted on peer device 1's user interface with a different color to indicate that this subexpression has been selected. Peer device 1 may send information to other peer devices that the selected node has been chosen along with a network ID array of the selected node (Block 318). In particular, peer device 1 may send a node name, node position, and network ID array of the new node to the other peer devices. In some instances, this is the only information shared at this time, which thereby reduces latency and bandwidth expenditures. Recoloring animations can be processed and animated locally and independently on each peer device that receives this information. For instance, peer device 1 may only send a name of the selected node (e.g., a string such as "+"), its position, and the network ID array of the selected node. The other peer devices can receive this name and position and locally, associate an object with the new node, and add the new node to each of their local mathematical expression trees (Block 320). The node type and local ID can be created locally on each peer device including peer device 1 without sharing these ID's. All instantiation and repositioning/recolor/resizing algorithms can be run locally on each peer device independently. This same procedure applies for deletion of a node.

By sending the network ID array (e.g., Network ID of node, Network ID of node's parent, Sibling Index) rather than a full description of the expression tree as it is entered, the P2P system reduces latency and bandwidth usage.

Once all nodes have been entered by peer device 1 (Decision 322) the method 300 can continue to FIG. 4 and manipulation.

Manipulating Expressions in the Peer-to-Peer System

Description of P2P manipulation will be enhanced by reference to the method FIGS. 4 and 5 as well as the visualization of an exemplary expression (FIG. 6) and a corresponding local mathematical expression tree (FIG. 7).

The method 300 can follow Decision 322 by locally initializing MMM's on each peer device (Block 424 in FIG. 4). Where conflict resolution is needed, peer device 1 and one or more additional peer devices may detect a node drag and generate a corresponding timestamp (Blocks 426 and 428). Peer device 1 can send its timestamp along with a network ID array of the selected node to other peer devices (Block 430), and the other peer devices can send their timestamps along with corresponding network ID arrays of their selected nodes to the other peer devices including peer device 1 (Block 432). The P2P system can carry out conflict resolution (Block 434) as described earlier and as optionally exemplified by the method shown in FIG. 8.

Given a controlling peer device and one or more slave peer devices, the controlling peer device can generate a local dragged node (Block 436). FIG. 6B shows an expression where the portion of the expression "2" is being dragged. The dragged node can be rendered as a first "2" (704) while the picked node can be rendered as a second "2" (702) that remains fixed in position, but has a different appearance than the rendering of the dragged node. For instance, the rendering of the dragged node can be solid, just as the non-selected elements of the expression, while the rendering of the picked node can be cross hatched or rendered in a grey color. The rendering of the dragged node 704 can follow the user's dragging input. The dragged node 804 can be created as a copy of the picked node 802, but cleaned of extraneous information. The picked node 802 can remain in place within the local mathematical expression tree 800.

The controlling peer device can generate drop regions and assign collision objects to the drop regions (Block 437). FIG. 7C shows drop regions D1, D2, D3, D4, and D5 which have been added to the local mathematical expression tree 800 according to application of one or more MMM's as described relative to FIGS. 1-2. The tree shown in FIG. 7C can be referred to as a "decorated" tree since the drop regions D1-D5 add visual cues to the user interface, but do not change the fundamentals of the expression tree 800 and will be removed upon final animation of the expression tree 800. FIG. 6C illustrates a rendering of the decorated expression tree of FIG. 7C.

To synchronize the dragging with peer devices, the P2P system of the controlling peer device sends information describing the picked node 802 and optionally information describing the dragged node 804 to the slave peer devices (Block 438). For instance, the controlling peer device may send a network ID array for the selected node 802 and optionally for the dragged node 804. More specifically, this network ID array can include a network ID for the selected node 802, a network ID for the parent of the selected node 802, and a Sibling Index of the selected node 802. In the example of FIGS. 6 and 7, this array would be (3,4,0).

The slave peer devices can receive this information and update their own local mathematical expression trees with their own selected nodes. Optionally, the slave peer devices can also create local instances of the dragged node. Although not shown, in an embodiment, the controlling peer device can send information describing the dragged node as it moves rather than only when it is created, collides with a drop region, and is dropped/released. This embodiment still maintains low latency and low bandwidth utilization since passing a descriptor of the dragged node and its location, even every frame, is still far less information transfer than if the whole tree description were transferred every frame.

The controlling peer device can then create drop regions per FIGS. 1-2 (Blocks 114-126) based on its selected node 802 (Block 440). This is shown in FIG. 7C and its rendered counterpart in FIG. 6C. The controlling peer device can then optionally send information describing these drop regions to the slave peer devices (Block 442). The slave peer devices can then add these drop regions to their local mathematical expression trees (Block 444). However, where the drop regions are not communicated, each slave peer device can create local instances of the drop regions based on the dragged node information shared in Block 439. In this instance, Blocks 442 and 444 can be omitted.

When the dragged node 704 collides with a collision object of the drop regions, then optional Blocks 445, 447, and 449 can be implemented. If the dragged node 702 is dropped/released without collision, then these optional blocks can be omitted. For this description, we will assume that a collision occurs. The controlling peer device can detect a collision (Block 445) caused by the user dragging the rendering of the dragged node 604 over or in proximity to one of the renderings of the drop regions D1-D5, as for instance seen in FIG. 6D where the "2" is dragged into proximity to the rendering of drop region D2. The controlling peer device can send collision information to the slave peer devices, for instance including an identification of the drop region where the collision occurred (Block 447). Where the position of the dragged node 702 is periodically transmitted to slave devices, the slave peer devices may already have a fairly accurate positional representation of the dragged node 702. However, where the position of the dragged node 702 is sent less than every frame (e.g., every fifth frame or only when a collision event occurs), then the slave peer devices can update their local mathematical expression trees and update their user interface (Block 449). For instance, the slave peer devices may only know about the selected node 702 and the collision with the drop region D2. In this situation, the slave peer devices can locally animate a movement of the rendering of the dragged node 704 between the position of the rendering of the selected node 602 and the position of the rendering of the drop region D2. In other words, the slave peer devices may generate an animation of the expression to transition from the visualization in FIG. 6C to FIG. 6D.

Blocks 445, 447, and 449 can be repeated for every collision until the user drops/releases the dragged node. At this point, see FIG. 5, the controlling peer device determines if the dragged node is dropped/released within or in proximity to a drop region (Decision 446). If not, then the controlling peer device deletes the dragged node 702, sets the picked node 802 to null, and returns the rendering of the dragged node 604 to the position of the rendering of the selected node 602. For instance, the expression 600 would return to FIG. 6A. The controlling peer device can send info about the deleted dragged node to the slave peer devices (Block 450) and the slave peer devices can also update their local mathematical expression trees and user interfaces (Block 451).

If the dragged node is released within or proximal to a drop region (Decision 446), then the controlling peer device can select one or more math laws or MMM's based on the drop region (454), the picked node (456), and the local mathematical expression tree (458), and apply these to rearrange the local mathematical expression tree (Block 452). The controlling peer device can also remove the drop regions from the tree (Block 452) (see also FIG. 7D). It can also update the user interface (Block 460) as shown in the example at FIG. 6E.

At the same time or after these local updates occur, the controlling peer device can send changed node information to the slave clients (Block 462). This may include network ID arrays for any changed nodes in the local mathematical expression tree. However, the controlling peer device may also just inform the slave peer devices that the dragged node was released and the network ID array of the drop region where the dragged node was released. In this case the slave peer devices can determine their own rearrangements of the local mathematical expression trees (Block 464). Either way, the slave peer devices can also then update their user interface (Block 464) to reflect the rearranged trees.

This can constitute an end of manipulation for the controlling device and the P2P system can return to FIG. 4 and monitoring for dragged node events (Blocks 426, 428). This may also involve the controlling peer device relinquishing control of the expression.

Authority Switching Mechanism

As described above, the P2P system assigns authority to one of the peer devices based to determine who is allowed to manipulate a shared equation, or system of equations at any given time. This authority switching mechanism can be referred to as Passive. However, there may be situations in a classroom or tutoring situation where one user wishes to actively switch authority between peer devices. In this case, one user (the teacher or tutor) may desire more direct control over who is allowed to manipulate the expressions in a shared workspace at any given time. This is useful, for example, when a teacher is demonstrating to a classroom how to solve an equation. In this case, the teacher may open up a shared workspace to each of their students, who can view the expression on their own peer devices. While the teacher is manipulating the equation, the teacher may actively give his/her peer device control, and the students cannot begin manipulating the shared equation. In the course of the derivation, the teacher may want to assign authority to one of the students to give them the opportunity to manipulate the expression. This is accomplished in the active switch mode by an authority button or indicator which the teacher presses to give one of the students temporary control. While this indicator is selected, that student's peer device, and only that student's peer device has control over the shared equation. The teacher can switch authority to any student, at any time.

The passive switch mechanism is useful when, for example, when students are connecting to their friends for a remote group study session, and no one user should be distinguished over any other to have more control over the shared workspace. In this case, as described above, before a drag event no one user has authority over the shared workspace. Authority is granted when a drag event is started and the timestamp comparison reveals that one particular user should be given temporary authority. This determination is performed independently on each peer device. While one user has temporary authority all other users are blocked from manipulating the shared workspace. Temporary authority is rescinded from the controlling peer device when the system has determined that the drag event is finished. This occurs after a fixed time (possibly immediately) following a drop/release of the dragged node.

Figure 9:
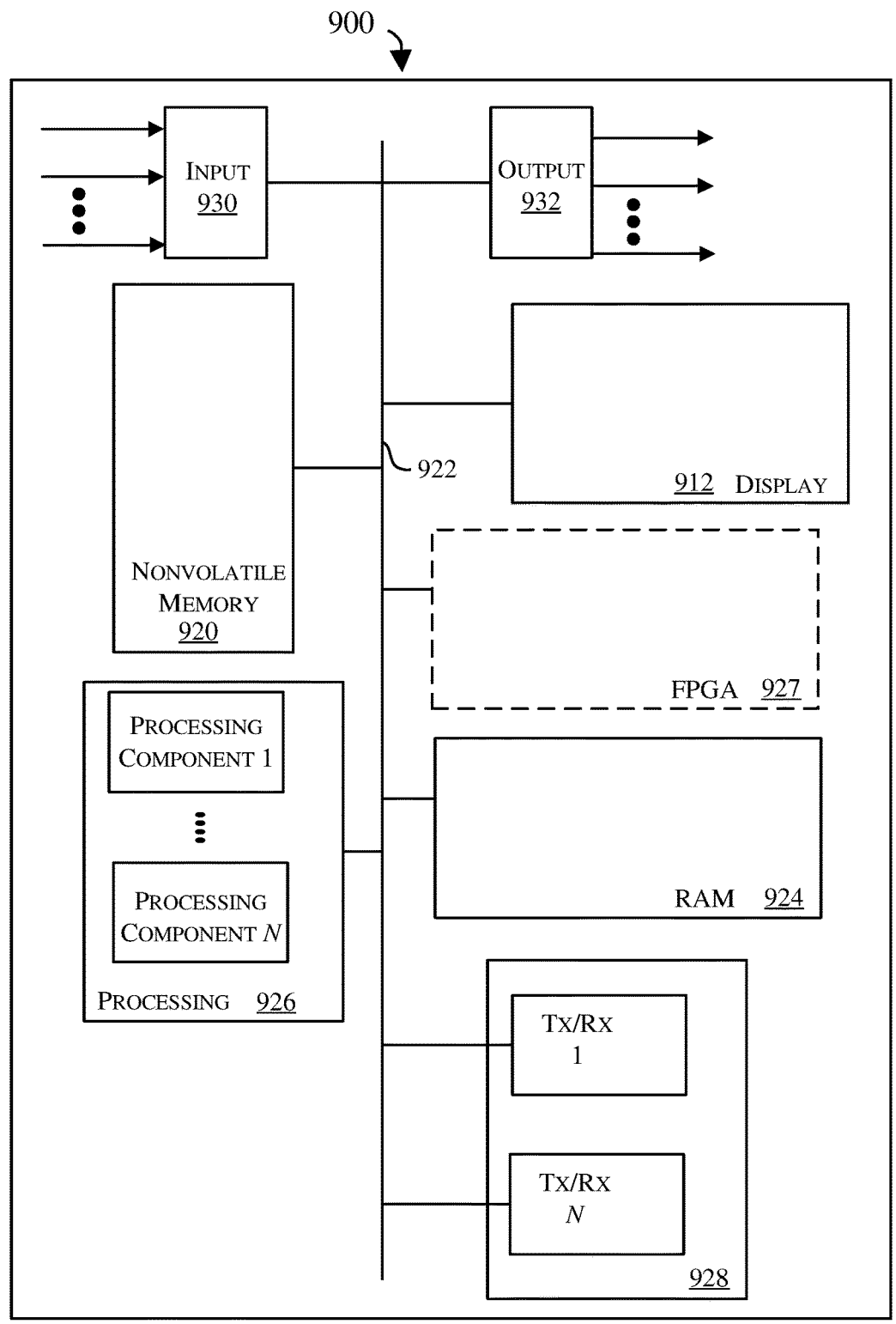
FIG. 9 illustrates a block diagram depicting physical components that may be utilized to realize the math engine and P2P system according to an exemplary embodiment.
Figure 10:
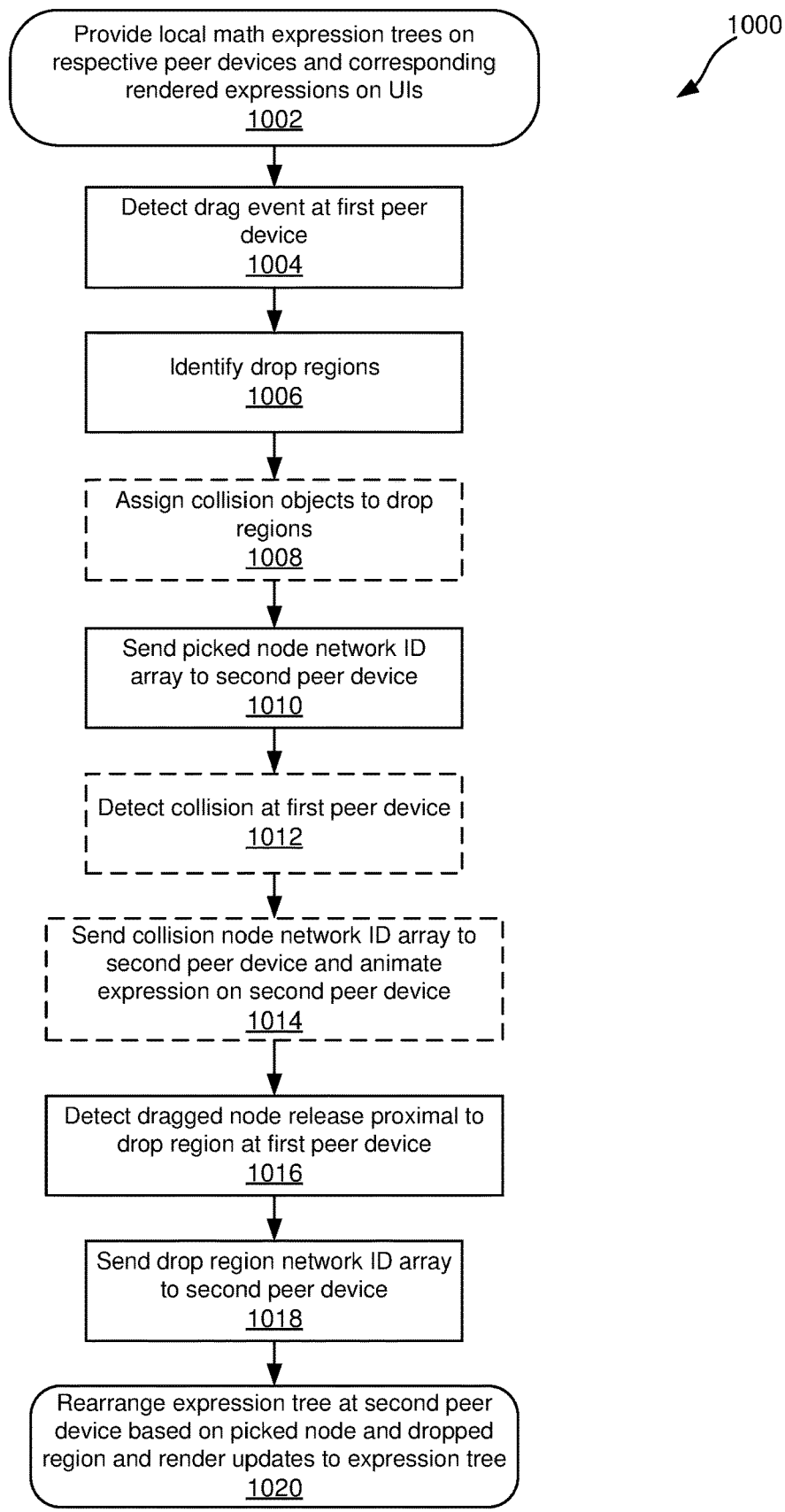
FIG. 10 illustrates another embodiment of a method of low-latency math expression manipulation, communication, and collaboration across multiple peer devices.

The methods described in connection with the embodiments disclosed herein may be embodied directly in hardware, in processor-executable code encoded in a non-transitory tangible processor readable storage medium, or in a combination of the two. Referring to FIG. 9 for example, shown is a block diagram depicting physical components that may be utilized to realize the math engine and P2P system according to an exemplary embodiment. As shown, in this embodiment a display portion 912 and nonvolatile memory 920 are coupled to a bus 922 that is also coupled to random access memory ("RAM") 924, a processing portion (which includes N processing components) 926, an optional field programmable gate array (FPGA) 927, and a transceiver component 928 that includes N transceivers. Although the components depicted in FIG. 9 represent physical components, FIG. 9 is not intended to be a detailed hardware diagram; thus many of the components depicted in FIG. 9 may be realized by common constructs or distributed among additional physical components. Moreover, it is contemplated that other existing and yet-to-be developed physical components and architectures may be utilized to implement the functional components described with reference to FIG. 9.

This display portion 912 generally operates to provide a user interface for a user, and in several implementations, the display is realized by a touchscreen display. In general, the nonvolatile memory 920 is non-transitory memory that functions to store (e.g., persistently store) data and processor-executable code (including executable code that is associated with effectuating the methods described herein). In some embodiments for example, the nonvolatile memory 920 includes bootloader code, operating system code, file system code, and non-transitory processor-executable code to facilitate the execution of methods described with reference to FIGS. 1-5 described further herein.

In many implementations, the nonvolatile memory 920 is realized by flash memory (e.g., NAND or ONENAND memory), but it is contemplated that other memory types may be utilized as well. Although it may be possible to execute the code from the nonvolatile memory 920, the executable code in the nonvolatile memory is typically loaded into RAM 924 and executed by one or more of the N processing components in the processing portion 926.

The N processing components in connection with RAM 924 generally operate to execute the instructions stored in nonvolatile memory 920 to enable a method of low-latency math expression manipulation, communication, and collaboration across multiple peer devices. For example, non-transitory, processor-executable code to effectuate the methods described with reference to FIGS. 1-5 may be persistently stored in nonvolatile memory 920 and executed by the N processing components in connection with RAM 924. As one of ordinarily skill in the art will appreciate, the processing portion 926 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 926 may be configured to effectuate one or more aspects of the methodologies described herein (e.g., the methods described with reference to FIGS. 1-5). For example, non-transitory processor-readable instructions may be stored in the nonvolatile memory 920 or in RAM 924 and when executed on the processing portion 926, cause the processing portion 926 to perform a method of low-latency math expression manipulation, communication, and collaboration across multiple peer devices. Alternatively, non-transitory FPGA-configuration-instructions may be persistently stored in nonvolatile memory 920 and accessed by the processing portion 926 (e.g., during boot up) to configure the hardware-configurable portions of the processing portion 926 to effectuate the functions of the math engine and P2P system.

The input component 930 operates to receive signals (e.g., drag and release signals from a user interface such as a touchscreen) that are indicative of one or more aspects of the dragged node. The output component generally operates to provide one or more analog or digital signals to effectuate an operational aspect of the math engine and/or P2P system. For example, the output portion 932 may provide the network ID array that is passed to slave peer devices described with reference to FIGS. 1-5. When the output portion 932 is realized my an output of a radio or modem, the output signal can be realized by an encoded signal, for example, encoded with the network ID array and other information about a local mathematical expression tree.

The depicted transceiver component 928 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of low-latency math expression manipulation, communication, and collaboration across multiple peer devices, the method comprising:
   providing a first local mathematical expression tree on a first peer device and a second local mathematical expression tree on a second peer device, wherein renderings of the first and second local mathematical expression trees appear as the same expressions on respective graphical user interfaces of the first and second peer devices;
   detecting, at the first peer device, that a user is dragging a portion of the expression, the portion identified as a picked node in the first local mathematical expression tree;
   identifying, via the first peer device, a plurality of drop regions in the first local mathematical expression tree;
   sending at least an identification of the picked node from the first peer device to the second peer device;
   detecting, via the first peer device, a collision between the portion of the first expression being dragged by the user and a first drop region;
   sending at least an identification of the first drop region from the first to the second peer device, and in response to the identification of the first drop region and the picked node, animating the second expression;
   detecting, via the first peer device, that the user has released the portion of the first expression in proximity to a triggered drop region;
   sending at least an identification of the triggered drop region to the second peer device; and
   determining, via the second peer device, a rearrangement of the second local mathematical expression tree based on the identification of the picked node and the identification of the triggered drop region, and rendering the rearrangement of the second local mathematical expression tree.

2. The method of claim 1, wherein the picked node is associated with a node type, a local ID, and a network ID array.

3. The method of claim 1, wherein the picked node is associated with a node type, a local ID, and a network ID array, and wherein the identification of the picked node comprises the network ID array.

4. The method of claim 3, wherein the network ID array comprises at least three values: a network ID for the picked node; a network ID of a parent of the picked node; and a Sibling Index of the picked node.

5. The method of claim 2, wherein each of the drop regions is associated with a node type, a local ID, and a network ID array.

6. The method of claim 3, wherein each of the drop regions is associated with a node type, a local ID, and a network ID array, and wherein the identification of the one of the drop regions comprises the network ID array for the one of the drop regions.

7. The method of claim 6, wherein the network ID array comprises at least three values: a network ID for a given drop region; a network ID of a parent of the given drop region, and a Sibling Index of the given drop region.

8. The method of claim 1, further comprising determining, via the first peer device, a rearrangement of the first local mathematical expression tree based on the identification of the picked node and the identification of the triggered drop region, and rendering the rearrangement of the first local mathematical expression tree.

9. A non-transitory, tangible computer readable storage medium, encoded with processor readable instructions to perform a method for low-latency math expression manipulation, communication, and collaboration across multiple peer devices, the method comprising:
   providing a first local mathematical expression tree on a first peer device and a second local mathematical expression tree on a second peer device, wherein renderings of the first and second local mathematical expression trees appear as the same expressions on respective graphical user interfaces of the first and second peer devices;
   detecting, at the first peer device, that a user is dragging a portion of the expression, the portion identified as a picked node in the first local mathematical expression tree;
   identifying, via the first peer device, a plurality of drop regions in the first local mathematical expression tree;
   sending at least an identification of the picked node from the first peer device to the second peer device;
   detecting, via the first peer device, a collision between the portion of the first expression being dragged by the user and a first drop region;
   sending at least an identification of the first drop region from the first to the second peer device, and in response to the identification of the first drop region and the picked node, animating the second expression;
   detecting, via the first peer device, that the user has released the portion of the first expression in proximity to a triggered drop region;
   sending at least an identification of the triggered drop region to the second peer device; and
   determining, via the second peer device, a rearrangement of the second local mathematical expression tree based on the identification of the picked node and the identification of the triggered drop region, and rendering the rearrangement of the second local mathematical expression tree.

10. The non-transitory, tangible computer readable storage medium of claim 9, wherein the picked node is associated with a node type, a local ID, and a network ID array.

11. The non-transitory, tangible computer readable storage medium claim 9, wherein the picked node is associated with a node type, a local ID, and a network ID array, and wherein the identification of the picked node comprises the network ID array.

12. The non-transitory, tangible computer readable storage medium claim 11, wherein the network ID array comprises at least three values: a network ID for the picked node; a network ID of a parent of the picked node; and a Sibling Index of the picked node.

13. The non-transitory, tangible computer readable storage medium claim 10, wherein each of the drop regions is associated with a node type, a local ID, and a network ID array.

14. The non-transitory, tangible computer readable storage medium claim 11, wherein each of the drop regions is associated with a node type, a local ID, and a network ID array, and wherein the identification of the one of the drop regions comprises the network ID array for the one of the drop regions.

15. The non-transitory, tangible computer readable storage medium claim 14, wherein the network ID array comprises at least three values: a network ID for a given drop region; a network ID of a parent of the given drop region, and a Sibling Index of the given drop region.

16. The non-transitory, tangible computer readable storage medium claim 9, further comprising determining, via the first peer device, a rearrangement of the first local mathematical expression tree based on the identification of the picked node and the identification of the triggered drop region, and rendering the rearrangement of the first local mathematical expression tree.

* * * * *